March 26, 1935.  C. R. STOUGH ET AL  1,995,691
BRAKE DRUM ASSEMBLY
Filed April 15, 1932   4 Sheets-Sheet 1
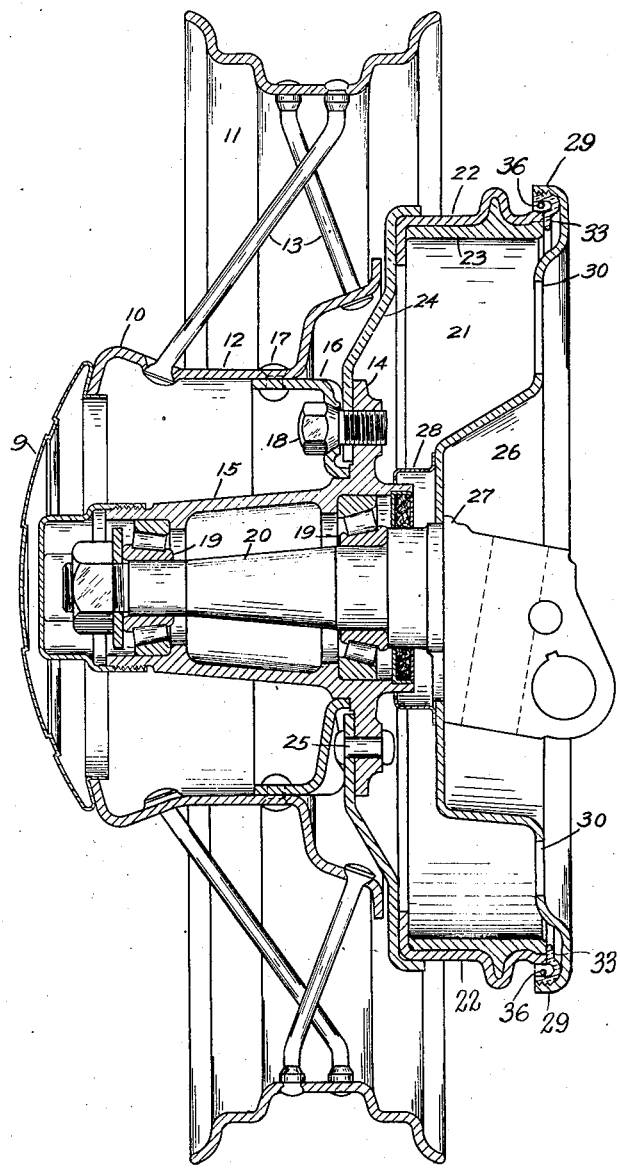
Fig. I
INVENTORS
Charles R. Stough and
Frank W. Schmidt.
BY
Carroll R. Taber
THEIR ATTORNEY.

March 26, 1935.   C. R. STOUGH ET AL   1,995,691
BRAKE DRUM ASSEMBLY
Filed April 15, 1932   4 Sheets-Sheet 2
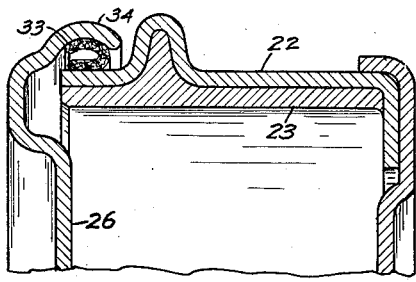
Fig. II
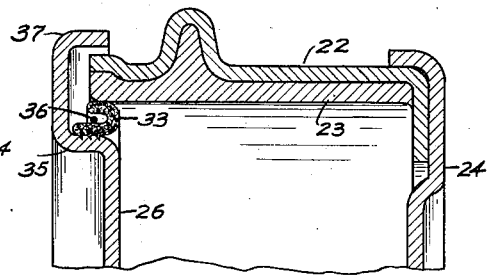
Fig. III
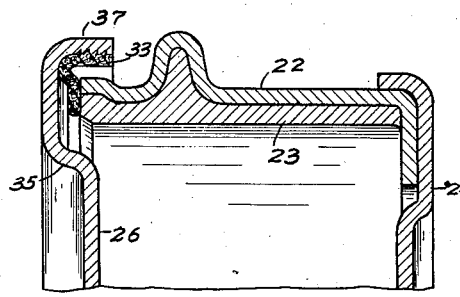
Fig. IV
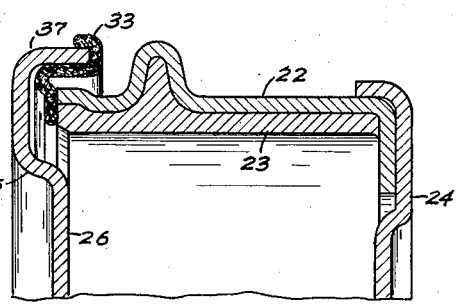
Fig. V
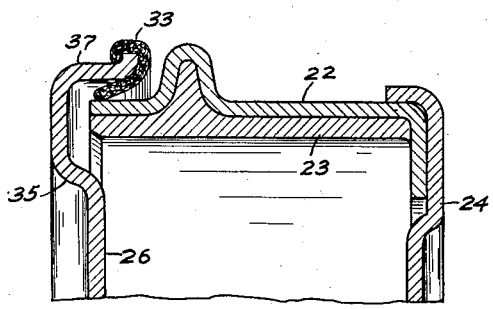
Fig. VI
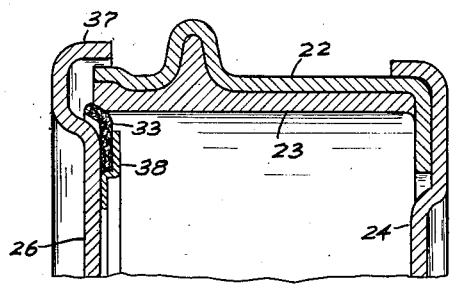
Fig. VII
INVENTORS
Charles R. Stough and
Frank W. Schmidt
BY
Carroll R. Taber
THEIR ATTORNEY.

March 26, 1935. C. R. STOUGH ET AL 1,995,691
BRAKE DRUM ASSEMBLY
Filed April 15, 1932 4 Sheets-Sheet 3
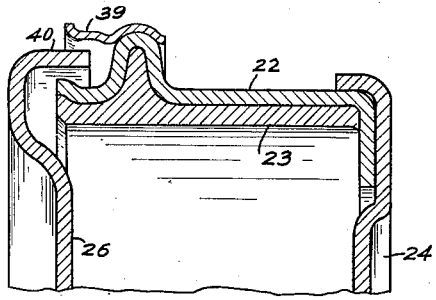
Fig. VIII
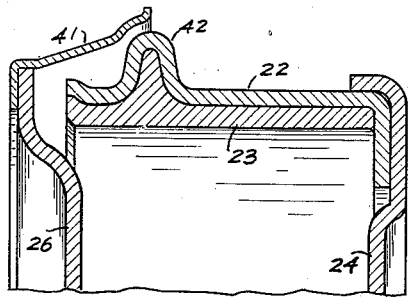
Fig. IX
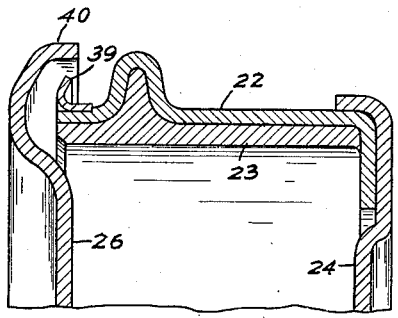
Fig. X
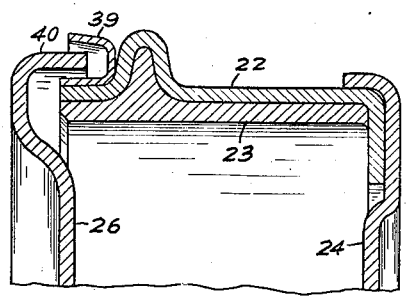
Fig. XI
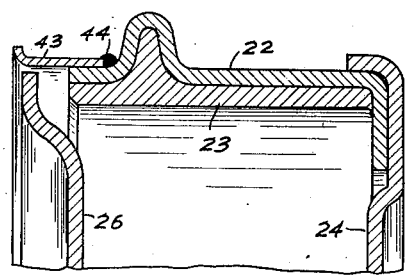
Fig. XII
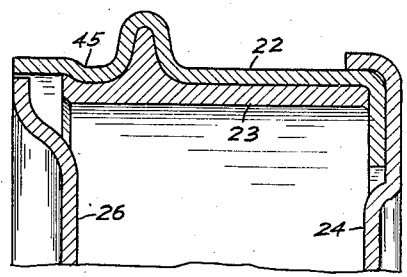
Fig. XIII
INVENTORS
Charles R. Stough and
Frank W. Schmidt
BY
Carroll R. Faber
THEIR ATTORNEY.

March 26, 1935. C. R. STOUGH ET AL 1,995,691
BRAKE DRUM ASSEMBLY
Filed April 15, 1932 4 Sheets-Sheet 4
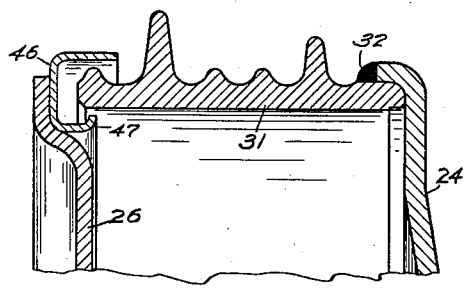
Fig. XIV
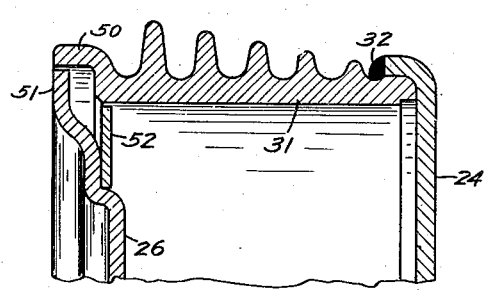
Fig. XV
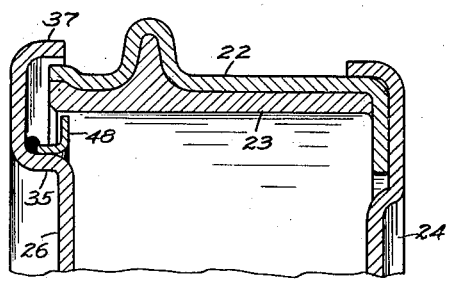
Fig. XVI
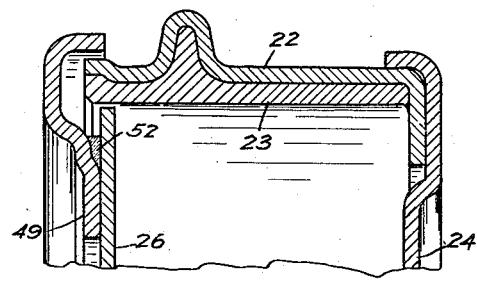
Fig. XVII
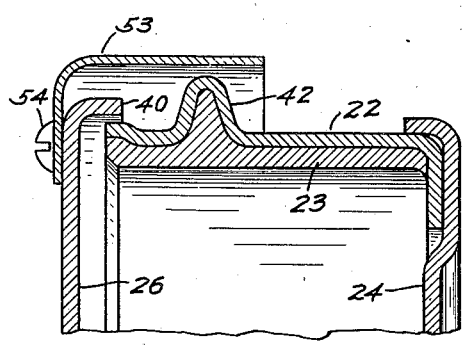
Fig. XVIII
INVENTORS
Charles R. Stough and
BY Frank. W. Schmidt.
Carroll R. Taber
THEIR ATTORNEY.

UNITED STATES PATENT OFFICE 1,995,691

BRAKE DRUM ASSEMBLY

Charles R. Stough and Frank W. Schmidt, Lansing, Mich., assignors to Motor Wheel Corporation, Lansing, Mich., a corporation of Michigan Application April 15, 1932, Serial No. 605,438

6 Claims. (Cl. 188—218)

This invention relates to brake drum assemblies and more particularly to brake drum assemblies of the so-called internal expanding type. The splashing or throwing of water, mud or gravel by the wheels, running board and fenders of an automobile into contact with the braking surface of the brake drum assemblies associated therewith shortens the life and frequently causes unsatisfactory operation of brake drum assemblies. In the brake drums in use heretofore the only means relied upon for preventing foreign substances from coming in contact with the braking surface has been a conventional backing plate positioned to substantially close the open face of the brake drum and provided with a peripheral flange spaced from and encircling the open edge of the brake drum. Due to the different angles from which water, mud and similar foreign substances are splashed or thrown by the various parts of the automobile, the conventional backing plate is inadequate to completely seal the braking surface of the brake drum from such foreign substances.

Accordingly, the principal object of the present invention is the provision of novel means adapted to prevent foreign substances from coming in contact with the braking surface of the brake drum. Another object of the invention is the provision of a flexible seal for brake drums. A further object is the provision of a removable seal for brake drum assemblies. Other objects more or less ancillary to the foregoing will appear in the following description and claims.

For a better understanding of the invention reference may now be had to the accompanying drawings, in which:

Fig. I is a cross sectional view of a conventional wheel and brake drum assembly;

Figs. II to VII inclusive are partial sectional views through brake drum assemblies including as an element thereof flexible sealing means, some of which are removable;

Figs. VIII to XVI inclusive are partial sectional views of brake drum assemblies including as an element thereof metallic or rigid sealing means, some of which are removable; and Fig. XVII is a partial cross sectional view of a brake drum assembly embodying a combination metallic and flexible seal; and Fig. XVIII is a partial cross sectional view of a brake drum assembly embodying a seal somewhat similar to that shown in Fig. IX.

The vehicle wheel 10 shown in Fig. I comprises a rim 11 secured to a hub shell 12 by means of a plurality of spokes 13. The hub shell 12 is secured to an annular flange 14 formed integrally with the hub 15 by means of an annular bracket member 16 connected to the hub shell 12 by the rivets 17 and to the annular hub flange 14 by means of stud bolts 18. The hub 15 is provided with a plurality of bearing members 19 within which is supported a conventional vehicle wheel axle member 20. A hub cap 9 may be used to close the open end of the hub shell 12. A brake drum 21 comprising an annular brake ring 22 provided with a suitable braking material 23 on its inner surface and a brake web 24 secured to the brake band 22 in any suitable manner as by welding, is secured to the annular flange 14 of the hub 15 by means of rivets 25 and the stud bolts 18. A backing plate 26 is secured to the inner extremity of the axle member 20 against an enlarged shoulder 27 formed thereon. An annular baffle or seal 28 is secured to the backing plate 26 whereby to substantially close the opening between the inner extremity of the hub 15 and the backing plate. The backing plate 26 substantially closes the open face of the brake drum 21 and has a peripheral flange 29 disposed in spaced concentric relation to one edge of the brake band 22. The backing plate is provided with suitable openings 30 through which extends mechanism for operating the brake shoe, not shown.

It will be observed that the peripheral flange 29 of the backing plate 30 overhangs the edge of the brake band 22 in such manner as to prevent foreign substances of any kind entering within the brake band directly but does not prevent such substances from passing between the edge of the brake band 22 and the flange 29 when moving in a direction away from the wheel and toward the backing plate 30. Consequently, the conventional backing plate 26 shown in Fig. I serves to only partially prevent foreign substances from entering the brake drum 21 and lodging between the braking surface 23 and the brake shoe, not shown, whereby to prevent the satisfactory operation of the brake assembly and to cause the premature deterioration of the braking surface.

A sealed ring 33 formed of suitable flexible wear resisting fibrous material is positioned between the peripheral flange 29 and the edge of the brake ring 22. This ring serves to prevent water and other foreign substances from entering the brake drum and interfering with the operation thereof. The seal is secured in position by means of a resilient wire ring 36 which presses the same firmly against the inner surface of the flange 29. The seal is positioned so that the inner edge thereof engages the edge of the brake ring 22. It is formed with sufficient rigidity to maintain contact with the edge of the ring 22. As the brake ring rotates the edge thereof rotates against the seal 33 thus maintaining an effective closure at all times between the stationary backing plate 26 and the rotating brake drum 21.

The various modified forms of seals shown in Figs. II to XVII inclusive are designed to provide a substantially perfect seal against the admission of foreign substances to the interior of the brake drum assembly with which they are associated. Each of the structures shown in Figs. II to XIII inclusive and XVI to XVII includes a backing plate 26, a brake ring 22 having a braking surface 23 secured thereto and a brake drum web 24 secured to the brake ring 22 by welding or other suitable means. The structure shown in Figs. XIV and XV includes a backing plate 26, a cast metal brake ring 31, and a brake drum web 24 welded to the brake ring 31 at 32.

The seal forming a part of the brake drum assembly illustrated in Fig. II consists of an annular fibrous ring 33 folded upon itself and positioned between the curved peripheral flange 34 of the backing plate 26 and the adjacent edge of the brake ring 22. The fibrous ring 33, which may be of any suitable flexible wear-resisting material such as leather or the like, is secured to the external surface of the brake ring 22 by being stretched over the edge thereof. As the brake drum rotates the fibrous ring 33 will usually rotate with the ring 22 and slide against the inner surface of the peripheral flange 34. In this manner water as well as other foreign substances is prevented from entering within the brake band 22.

The seal shown in Fig. III is substantially identical to the seal shown in Fig. II except that it is secured to the flange portion 35 of the backing plate 26 by means of a flexible wire ring 36 which presses the flexible fibrous seal 33 against the corrugated portion of the backing plate 26. The peripheral portion of the backing plate 26 is also flanged as indicated at 37 whereby it overhangs the outer extremity of the ring 22. The flexible fibrous seal 33 slides against the outer edge of the braking surface 23. Accordingly any water or other foreign substance which enters between the peripheral flange 37 and the outer extremity of the ring 22 is prevented from coming in contact with the braking surface 23 by the seal 33.

The structure shown in Fig. IV is substantially the same as the brake drum assembly shown in Fig. I except that the fibrous seal 33 is preferably secured in position by being vulcanized to the flange 37. In the assembly shown in Fig. IV the seal 33 is preferably made of fibrous material sufficiently rigid to permit it to be molded to the desired shape whereby the free extremity thereof is held against the outer edge of the brake ring 22 and its braking surface 23 whereby to prevent all foreign substances from entering within the brake drum.

The assembly shown in Fig. V is identical to that shown in Fig. IV with the exception that the fibrous seal 33 is of slightly different design. In this case the seal is pre-molded or formed to the contour shown whereby it is fitted on to the free edge of the peripheral flange 37 of the backing plate 26 and held there by its own elasticity and by reason of the pressure against its free extremity by the edge of the brake ring 22 and braking surface 23.

Fig. VI is a slightly modified form of the structure shown in Fig. V. In this assembly the free end of the peripheral flange 37 is turned upwardly to provide an annular shoulder to which is resiliently secured a premolded fibrous seal 33. The free end of the fibrous seal contacts with the outer surface of the brake ring 22 and thereby prevents foreign substances from entering within the brake drum.

The structure shown in Fig. VII comprises a conventional brake drum and backing plate assembly with the addition of an annular seal retaining ring 38 welded or otherwise secured to the inner surface of the backing plate 26. A fibrous seal 33 in the shape of a ring has one edge thereof fitted into the slot formed by the backing plate 26 and the retaining ring 38 and its other extremity contacts the free edge of the braking surface 23. Accordingly, any water or other foreign substances which pass through the opening between the edge of the backing plate flange 37 and the brake ring 22 is caught by the fibrous seal 33 and due to the circular formation of the seal and backing plate, passes to the lower side thereof and falls away from the brake drum assembly.

The assemblies shown in Figs. VIII, X and XI each include a resilient removable metal seal 39 in the form of a shield secured to the brake ring 22 by being pressed or forced into engagement therewith. In each of these assemblies the peripheral flange 40 of the backing plate 26 prevents foreign substances from entering the opening between the backing plate and the brake ring 22 from one direction and the seals or shields 39 prevent similar substances from entering the same opening from the opposite direction. In other words, each of these assemblies is provided with a double seal or shield adapted to prevent the admission of foreign substances to the interior of the brake drum assembly.

In the assembly shown in Fig. IX a metallic shield or seal is welded or otherwise suitably secured to the outer periphery of the backing plate 26 and extends partially over the rib portion 42 of the brake ring 22. Accordingly the rib portion 42 prevents foreign substances from entering the opening between the backing plate 26 and the brake ring 22 from one direction while the shield 41 prevents such substances from entering the same opening from the opposite direction. This assembly therefore is also provided with a double seal against the admission of foreign substances to the interior of the brake drum.

A metallic shield 43 in the form of an annular ring having an upturned flange at one edge thereof is secured to the brake ring 22 shown in Fig. XII by welding at 44. The flanged edge of the ring 43 extends beyond the outer periphery of the backing plate 26 whereby foreign substances of all kinds are prevented from entering the opening between the backing plate and the brake ring 22. Any water and dirt or similar substances which are thrown against the outer surface of the ring 43 are discharged therefrom by reason of the rotary movement of the ring 22 to which the ring 43 is attached.

The assembly shown in Fig. XIII embodies substantially the same idea as the assembly just described. In this case, however, the outer edge of the brake ring 22 is extended to overhang the outer periphery of the backing plate 26 and an annular groove 45 is formed in the ring 22 adjacent its outer edge to collect and drain off moisture and similar substances.

The assemblies shown in Figs. XIV, XVI and XVII each embody a flanged portion secured to the backing plate 26 which overhangs the edge of the brake ring and a guard or shield secured to the inner surface of the backing plate 26 and positioned to prevent foreign substances which have passed the overhanging flange from entering within the brake drum assembly. As shown in Fig. XIV this is accomplished by securing a substantially U shaped annular ring 46 to the outer periphery of the backing plate 26 by welding. One leg of the U shaped ring 46 overhangs the brake ring 31 and the curved extremity 47 of the other leg is positioned within the brake ring 31 in close proximity thereto. In Fig. XVI the backing plate 26 is provided with a peripheral flange 37 which overhangs the edge of the brake ring 22. An annular ring 48 of L shape in cross section is secured as by welding to the flanged portion 35 of the backing plate 26. One leg of the ring 48 lies within the brake ring 22 with its edge disposed adjacent the braking surface 23. In the assembly shown in Fig. XVII the backing plate 26 is disposed within the brake ring 22 and has its outer periphery positioned adjacent and slightly spaced away from the braking surface 23. An annular ring 49 has one edge secured to the outer surface of the backing plate 26 as by welding and its other edge is deformed to enclose the outer edge of the brake ring 22. A rubber seal 52 preferably in the form of a ring may be inserted between the backing plate and the ring 49 to prevent moisture from lodging between these parts.

A further modified form of the structure shown in Figs. XIV, XVI and XVII is shown in Fig. XV. In this case the outer edge of the brake ring 31 is flanged as indicated at 50 and the backing plate 26 is disposed with the body portion thereof within the brake ring 31 and with the flanged periphery 51 thereof spaced concentrically from the flange 50. An annular ring 52 has one edge secured to the inner surface of the backing plate 26 and its other edge disposed in concentric relation to the inner surface of the body of the brake ring 31.

The structure shown in Figure XVIII is a variation of the brake drum assembly illustrated in Fig. IX. In this variation the backing plate 26 terminates in a laterally extending peripheral flange 40 which overlies the open edge of the ring 22. A metallic shield 53, having one edge overlying the flange 40 and the rib 42 formed in the ring 22, is secured to the backing plate 26 by the securing members 54. The shield 53 is an incomplete ring and extends only partially around the periphery of the backing plate 26. Preferably it is of suitable extent and so positioned as to substantially close the top and front of the brake drum only. In this manner all foreign substances which may be thrown toward the brake drum by the various parts of the vehicle are prevented from entering within the drum, while at the same time the dust resulting from the internal wear of the friction surfaces within the drum is permitted to fall out of the drum at the under side thereof.

From the foregoing description it will be apparent that this invention provides a brake drum assembly embodying an unusually efficient seal which may be either of flexible or rigid material and which may be removably attached to the brake drum or backing plate or permanently secured thereto. While only the preferred modifications of the invention have been shown and described it should be understood that the invention is not limited thereto but is coextensive with the scope of the appended claims.

We claim:

1. A brake drum assembly comprising a brake ring, a backing plate disposed in spaced relation to one edge of the ring, a seal positioned between the edge of the ring and the backing plate whereby to close the opening therebetween, and removable resilient means for fastening the seal to the inner surface of the backing plate.

2. A brake drum assembly comprising a brake ring, a backing plate disposed in spaced relation to the edge of the ring, a seal positioned to close the opening between the edge of the ring and the backing plate, and a removable resilient ring for pressing the seal against the inner surface of the backing plate whereby to secure the seal thereto.

3. A brake drum assembly comprising a brake ring, a backing plate disposed in spaced relation to the ring and having a peripheral flange overlying an edge of the ring, a seal positioned to close the opening between the said flange and the edge of the ring, and a removable resilient ring for pressing the seal against the inner surface of said flange whereby to secure the seal thereto.

4. A brake drum assembly comprising a brake ring, a backing plate disposed in spaced relation to the ring and provided with a peripheral channel partially enclosing an edge of the ring, a seal positioned to close the opening between the backing plate and the inner surface of the ring at one edge thereof, and a removable resilient ring for pressing the seal against a wall of said channel whereby to secure the seal thereto.

5. A brake drum assembly comprising a brake ring, a backing plate disposed in spaced relation to one edge of the ring, a seal positioned between the edge of the ring and the backing plate whereby to close the opening therebetween, and removable resilient means for fastening the seal to one of said parts.

6. A brake drum assembly comprising a brake ring, a backing plate disposed in spaced relation to one edge of the ring, a seal positioned between the edge of the ring and the backing plate whereby to close the opening therebetween, and removable means for securing the seal to the backing plate.

CHARLES R. STOUGH.
FRANK W. SCHMIDT.